United States Patent [19]

Rink et al.

[11] Patent Number: 5,759,631
[45] Date of Patent: Jun. 2, 1998

[54] COATING COMPOSITION BASED ON A HYDROXYL GROUP-CONTAINING POLYACRYLATE RESIN AND ITS USE IN PROCESSES FOR PRODUCING A MULTICOAT FINISH

[75] Inventors: Heinz-Peter Rink; Michael Brünnemann, both of Münster, Germany

[73] Assignee: BASF Lacke+Farben AG, Muenster-Hiltrup, Germany

[21] Appl. No.: 702,565

[22] PCT Filed: Feb. 28, 1995

[86] PCT No.: PCT/EP95/00732

§ 371 Date: Sep. 3, 1996

§ 102(e) Date: Sep. 3, 1996

[87] PCT Pub. No.: WO95/23832

PCT Pub. Date: Sep. 8, 1995

[30] Foreign Application Priority Data

Mar. 5, 1994 [DE] Germany ............... 44 07 415.8

[51] Int. Cl.$^6$ .................. B05D 7/14; B05D 1/36; C08F 8/30; C08F 220/16
[52] U.S. Cl. ............... 427/407.1; 427/409; 427/412.5; 524/507; 524/558; 525/374; 526/280; 526/320; 428/457
[58] Field of Search ................... 526/320, 280; 524/507, 558; 427/407.1; 525/375, 374

[56] References Cited

U.S. PATENT DOCUMENTS

| | | | |
|---|---|---|---|
| 4,504,635 | 3/1985 | Weber, Jr. et al. | 525/450 |
| 4,758,642 | 7/1988 | Yezrielev et al. | 526/320 |
| 5,239,028 | 8/1993 | Nakagawa et al. | 526/308 |
| 5,279,862 | 1/1994 | Corcoran et al. | 427/407.1 |
| 5,288,828 | 2/1994 | Harris et al. | 526/320 |

FOREIGN PATENT DOCUMENTS

| | | |
|---|---|---|
| 0 337 744 | 12/1989 | European Pat. Off. . |
| 2169911 | 7/1986 | United Kingdom . |

OTHER PUBLICATIONS

Kageishi Kazuji et al., Resin Composition for Electrocoating Dec. 7, 1989, 4 pages.

Nakagawa Hiroo et al., Acrylpolyol and Two-Oack Urethane Resin Coating Composition Containing Same. Jun. 14, 1988, 2 pages.

Primary Examiner—Tae Yoon

[57] ABSTRACT

Coating composition comprising
(A) at least one hydroxyl group-containing polyacrylate resin obtained by polymerizing
  (a) from 5 to 80% by weight of a cycloaliphatic ester of methacrylic acid and/or acrylic acid, or a mixture of such monomers,
  (b) from 10 to 50% by weight of a hydroxyl group-containing alkyl ester of methacrylic acid and/or acrylic acid, or mixtures of such monomers,
  (c) from 0 to 25% by weight of a hydroxyl group-containing, ethylenically unsaturated monomer, different from (a) and (b), or a mixture of such monomers,
  (d) from 5 to 80% by weight of an aliphatic ester of methacrylic and/or acrylic acid, different from (a)–(c), or a mixture of such monomers,
  (e) from 0 to 40% by weight of an aromatic vinyl hydrocarbon, different from (a)–(d), or a mixture of such monomers, and
  (f) from 0 to 40% by weight of an additional ethylenically unsaturated monomer, different from (a)–(e), or a mixture of such monomers,
and
(B) at least one crosslinking agent.

13 Claims, No Drawings

5,759,631

COATING COMPOSITION BASED ON A HYDROXYL GROUP-CONTAINING POLYACRYLATE RESIN AND ITS USE IN PROCESSES FOR PRODUCING A MULTICOAT FINISH

The present invention relates to a coating composition comprising
(A) at least one hydroxyl group-containing polyacrylate resin which is obtainable from
 (a) a cycloaliphatic ester of methacrylic acid and/or acrylic acid, or a mixture of such monomers,
 (b) a hydroxyl group-containing alkyl ester of methacrylic acid and/or acrylic acid, or mixtures of such monomers,
 (c) optionally a hydroxyl group-containing, ethylenically unsaturated monomer which is different from (a) and (b), or a mixture of such monomers,
 (d) an aliphatic ester of methacrylic and/or acrylic acid which is different from (a), (b) and (c), or a mixture of such monomers,
 (e) optionally an aromatic vinyl hydrocarbon which is different from (a), (b), (c) and (d), or a mixture of such monomers, and
 (f) optionally of [sic] a further ethylenically unsaturated monomer which is different from (a), (b), (c), (d) and (e), or a mixture of such monomers,
and
(B) at least one crosslinking agent.

The present invention also relates to processes for producing a multilayer protective and/or decorative coating on a substrate surface and to the use of the coating compositions in the sector of automotive refinishing.

Coating compositions based on hydroxyl group-containing polyacrylate resins and crosslinking agents are known, for example, from JP-A 4-1254. In this document, the hydroxyl group-containing polyacrylate resins which are employed as binder are obtainable from hydroxyl group-containing monomers, alkyl acrylates, alkyl methacrylates, optionally styrene and optionally ethylenically unsaturated polymers. In this context it is essential to the invention that the polyacrylate resin has been prepared using 4-t-butylcyclohexyl acrylate and/or 4-t-butylcyclohexyl methacrylate as monomer component. The hydroxyl group-containing monomer employed is, in particular, hydroxyethyl acrylate and/or hydroxyethyl methacrylate.

These coating compositions known from JP-A 4-1254, especially when used as a transparent topcoat over a basecoat, have the particular disadvantage that, when hydroxyethyl acrylate and/or hydroxyethyl methacrylate are used as OH monomer, the resulting coatings are of inadequate adhesion to the basecoat. The further disadvantage of these coating compositions known from JP-A 4-1254 is the inadequate pot life of the coating compositions.

The object of the present invention was therefore to provide coating compositions which, when used as a transparent topcoat over a pigmented basecoat, lead to coatings having an adhesion to the clearcoat which is improved relative to the coating compositions known from JP-A 4-1254. At the same time, the resulting coatings should be of good chemical resistance and good weathering resistance. In addition, the coating compositions should be suitable for automotive refinishing, i.e. they should be able to be cured fully at low temperatures of in general below 120° C., preferably below 80° C. Furthermore, the coating compositions should also reach full cure rapidly at these low temperatures (rapid dust dryness and freedom from tack, and rapid through-drying) while at the same time should be able to be processed for as long (pot life) as possible. Furthermore, the coating compositions should have a good topcoat appearance and, when used as clearcoat over a basecoat, should cause only minimal dissolution of the underlying basecoat and should exhibit a good light/dark effect when viewed at different angles. Finally, the coating compositions should exhibit very good leveling and should exhibit good application characteristics under the conditions of automotive refinishing.

This object is surprisingly achieved by a coating composition of the type mentioned initially, which is characterized in that component (A) is a hydroxyl group-containing polyacrylate resin which is obtainable by polymerizing
 (a) from 5 to 80% by weight of component (a),
 (b) from 10 to 50% by weight of component (b),
 (c) from 0 to 25% by weight of component (c),
 (d) from 5 to 80% by weight of component (d),
 (e) from 0 to 40% by weight of component (e), and
 (f) from 0 to 40% by weight of component (f)
to give a polyacrylate resin having a number-average molecular weight Mn of from 1000 to 5000, a ratio of the weight-average molecular weight Mw to the number-average molecular weight Mn of less than 5.0 and an OH number of from 60 to 180 mg of KOH/g, the sum of the proportions by weight of components (a) to (f) always being 100% by weight and the monomers or monomer mixtures employed as component (b) only being those which, on polymerization of the respective monomer alone, produce a polyacrylate and/or polymethacrylate resin having a glass transition temperature of from −10° C. to +6° C. or from +60° C. to 80° C.

The present invention also relates to a process for producing a multilayer coating on a substrate surface using these coating compositions, and to the use of the coating compositions in the sector of automotive refinishing.

It is surprising and was not foreseeable that the coating compositions according to the invention, when used as a transparent topcoat over a pigmented basecoat, exhibit a distinctly improved adhesion to the basecoat while at the same time having good chemical resistance and weathering resistance. A further advantage is that the coating compositions can be cured fully at low temperatures and thus can be employed for the sector of automotive refinishing. Even when the coating compositions are cured at these low temperatures, the coating compositions rapidly attain full cure, although at the same time are able to be processed for a long time. Furthermore, the coating compositions according to the invention have the advantage of a good topcoat appearance and exhibit, under the conditions of automotive refinishing, very good leveling and good application characteristics. Finally, when used as clearcoat over a basecoat, the coating compositions according to the invention have the advantage that they cause only minor dissolution of the basecoat and exert only a very small influence on the metallic effect.

In the text below, the individual constituents of the coating composition according to the invention are described in more detail.

The polyacrylate resin (A) which is employed in accordance with the invention is obtainable by polymerizing
 (a) from 5 to 80% by weight, preferably from 5 to 30% by weight, of a cycloaliphatic ester of methacrylic acid and/or acrylic acid, or of a mixture of such monomers,
 (b) from 10 to 50% by weight, preferably from 15 to 40% by weight, of a hydroxyl group-containing alkyl ester of methacrylic acid and/or acrylic acid, or of a mixture of such monomers, (c) from 0 to 25% by weight, preferably from 0 to 15% by weight, of a hydroxyl group-containing, ethylenically unsaturated monomer which is different from (a) and (b), or of a mixture of such monomers, (d) from 5 to 80% by weight, preferably from 5 to 30% by weight, of an aliphatic ester of methacrylic and/or acrylic acid which is different from (a), (b), (c) and (f), or of a mixture of such monomers, (e) from 0 to 40% by weight, preferably from 10 to 30% by weight, of an aromatic vinyl hydrocarbon which is different from (a), (b), (c), (d) and (f), or of a mixture of such monomers, and (f) from 0 to 40% by weight, preferably from 0 to 30% by weight, of a further ethylenically unsaturated monomer which is different from (a), (b), (c), (d) and (e), or a mixture of such monomers, to give a polyacrylate resin having a number-average molecular weight Mn of from 1000 to 5000, a ratio of the weight-average molecular weight Mw to the number-average molecular weight Mn of less than 5.0, preferably from 1.8 to 4.0, and an OH number of from 60 to 180, preferably from 100 to 150, mg of KOH/g, the sum of the proportions by weight of components (a) to (f) always being 100% by weight and the monomers or monomer mixtures employed as component (b) only being those which, on polymerization of the respective monomer alone, produce a polyacrylate and/or polymethacrylate resin having a glass transition temperature of from −10° C. to +6° C. or from +60° C. to 80° C.

The polymerization of the monomer components (a) to (f) is preferably carried out with the exclusion of oxygen, for example by working in a nitrogen atmosphere. The reactor is equipped with appropriate stirring, heating and cooling devices and with a reflux condenser to retain volatile constituents such as, for example styrene. The polymerization reaction is carried out at temperatures of from 100° to 180° C., preferably 130°–170° C., using appropriate polymerization initiators and, if desired, polymerization regulators.

Examples of suitable initiators for the preparation of the polyacrylate resins (A) are those containing tert-butyl groups, for example di-tert-butyl peroxide, tert-butyl hydroperoxide, 2,2-di-tert-butylperoxybutane and 1,3-bis (tert-butylperoxyisopropyl)benzene, dibenzoyl peroxide, tert-butyl peroxy-2-ethylhexanoate, tert-butyl peroxy-3,5,5-trimethylhexanoate, tert-butyl peroxypivalate, dicumyl peroxide, cumyl hydroperoxide, tert-amyl peroxybenzoate, tert-amyl peroxy-2-ethylhexanoate, diacyl peroxides such as, for example, diacetyl peroxide, peroxyketals, 2,2-di(tert-amylperoxy)propane, ethyl 3,3-di(tert-amylperoxy)butyrate and thermally labile, highly substituted ethane derivatives, based for example on silyl-substituted ethane derivatives and based on benzopinacol. In addition, aliphatic azo compounds such as, for example, azoisovaleronitrile and azobiscyclohexanenitrile can also be employed.

In most cases the quantity of initiator is from 0.1 to 8% by weight, based on the quantity of monomer to be processed, but may be even higher if desired. The initiator, dissolved in a proportion of the solvent which is employed for the polymerization, is metered in gradually during the polymerization reaction. The initiator feed preferably lasts from about 0.5 to 2 hours longer than the monomer feed, so as to achieve a good action during the afterpolymerization phase as well. If initiators having only a low decomposition rate under the prevailing reaction conditions are employed, then it is also possible to include the initiator in the initial charge.

The polymerization conditions (reaction temperature, feed time in the monomer mixture, nature and quantity of the organic solvents and polymerization initiators, possible use of molecular weight regulators such as, for example, mercaptans, thioglycolic esters and hydrogen chlorides) are chosen such that the polyacrylate resins which are employed in accordance with the invention have a number-average molecular weight of from 1000 to 5000, preferably from 1800 to 4000 (determined by gel permeation chromatography using polystyrene as calibrating material).

The acid number of the polyacrylate resin (A) is commonly between 0 and 30 mg of KOH/g.

The acid number of the polyacrylate resins which are employed in accordance with the invention can be adjusted by the person skilled in the art, by using appropriate quantities of component (f). Similar comments apply to the adjustment of the hydroxyl number. It can be controlled by way of the quantity of component (b) and (c) employed.

Examples of cycloaliphatic esters of acrylic acid and/or methacrylic acid which are suitable as component (a) are cyclohexyl acrylate, cyclohexyl methacrylate, 4-tert-butylcyclohexyl acrylate, 4-tert-butylcyclohexyl methacrylate, isobornyl acrylate and isobornyl methacrylate.

As component (a) it is preferred to employ 4-tert-butylcyclohexyl acrylate and/or 4-tert-butylcyclohexyl methacrylate.

It is essential to the invention that the monomers or monomer mixtures employed as component (b) are only those which, on polymerization of the respective monomer alone, produce a polyacrylate and/or polymethacrylate resin having a glass transition temperature of from −10° C. to +6° C. or from +60° C. to 80° C. This means that, when mixtures of different monomers are used as component (b), appropriate mixtures of course include those which, on polymerization of component (b) alone, produce a polyacrylate and/or polymethacrylate resin having a $T_g$ value which is outside these ranges indicated for the individual monomers.

The glass transition temperature can be calculated approximately by the person skilled in the art using the formula $$\frac{1}{T_G} = \sum_{n=1}^{n=x} \frac{W_n}{T_{G_n}}$$

$T_G$=glass transition temperature of the polymer
$x$=number of different monomers incorporated by polymerization,
$W_n$=proportion by weight of the nth monomer
$T_{G_n}$=glass transition temperature of the homopolymer of the nth monomer.

Component (b) is preferably selected from 3-hydroxypropyl methacrylate, 3-hydroxypropyl acrylate, 2-hydroxypropyl methacralate [sic] and/or 2-hydroxypropyl acrylate.

Further suitable hydroxyl group-containing monomers (component (c)) are hydroxyalkyl esters of $\alpha,\beta$-unsaturated carboxylic acids containing primary or secondary hydroxyl groups. If the acrylate copolymer is required to be of high reactivity, it is possible to employ exclusively hydroxyalkyl esters containing primary hydroxyl groups; if the polyacrylate is to be less reactive, hydroxyalkyl esters containing secondary hydroxyl groups can be employed exclusively. Of course, mixtures of hydroxyalkyl esters containing primary hydroxyl groups and hydroxyalkyl esters containing secondary hydroxyl groups can also be used. Examples of suitable hydroxyalkyl esters of $\alpha,\beta$-unsaturated carboxylic acids containing primary hydroxyl groups are hydroxybutyl acrylate, hydroxyamyl acrylate, hydroxyhexyl acrylate, hydroxyoctyl acrylate and the corresponding methacrylates.

Examples of hydroxyalkyl esters containing a secondary hydroxyl group which can be used are 2-hydroxybutyl acrylate, 3-hydroxybutyl acrylate and the corresponding methacrylates. It is of course also possible in each case to employ the corresponding esters of other α,β-unsaturated carboxylic acids, for example those of crotonic acid and of isocrotonic acid.

Advantageously, component (c) may at least in part be a reaction product of one mole of hydroxyethyl acrylate and/or hydroxyethyl methacrylate and on average two moles of ε-caprolactone. The component (c) employed may also be, at least in part, a reaction product of acrylic acid and/or methacrylic acid with the equivalent quantity of a glycidyl ester of a carboxylic acid having a tertiary α-carbon atom. Glycidyl esters of heavily branched monocarboxylic acids are available under the tradename "Cardura". The reaction of the acrylic acid or methacrylic acid with the glycidyl ester of a carboxylic acid containing a tertiary α-carbon atom may take place before, during or after the polymerization reaction.

The monomers (d) employed in accordance with the invention are preferably chosen such that the polymerization of component (d) alone produces a polyacrylate and/or polymethacrylate resin having a glass transition temperature of from −70° to 120° C.

Examples of monomers which are suitable as component (d) are methyl (meth)acrylate, ethyl (meth)acrylate, butyl (meth)acrylate, isopropyl (meth)acrylate, isobutyl (meth) acrylate, pentyl (meth)acrylate, isoamyl (meth)acrylate, hexyl (meth)acrylate, 2-ethylhexyl (meth)acrylate, furfuryl (meth)acrylate, octyl (meth)acrylate, 3,5,5,-trimethylhexyl (meth)acrylate, decyl (meth)acrylate, lauryl (meth)acrylate, hexadecyl (meth)acrylate, octadecyl (meth)acrylate, stearyl (meth)acrylate and ethyltriglycol (meth)acrylate.

The compounds which are suitable as component (e) are aromatic vinyl compounds. Component (e) preferably contains 8 to 9 carbon atoms per molecule. Examples of suitable compounds are styrene, vinyltoluenes, α-methylstyrene, chlorostyrenes, o-, m- or p-methylstyrene, 2,5-dimethylstyrene, p-methoxystyrene, p-tert-butyl-styrene, p-dimethylaminostyrene, p-acetamidostyrene and m-vinylphenol. Preference is given to employing vinyl toluenes, and in particular styrene.

Examples of compounds which are suitable as component (f) are alkoxyethyl acrylates, aryloxyethyl acrylates and the corresponding methacrylates, for example butoxyethyl (meth)acrylate and phenoxyethyl (meth)acrylate, methacrylonitrile and acrylonitrile, and alkyl esters of other ethylenically unsaturated carboxylic acids, for example alkyl esters of crotonic and isocrotonic acid, and also polymerizable vinyl ethers and vinyl esters.

The coating compositions according to the invention may in addition and if desired contain one or more other hydroxyl group-containing resins. For example, they may contain further hydroxyl group-containing acrylate resins which are different from the above-described acrylate resin (A), and/or polycondensation resins (especially polyester resin).

These other binders are usually employed in a quantity of from 0 to 25% by weight, preferably from 0 to 20% by weight, based in each case on the overall weight of the coating composition and based on the solids content of the binder.

Examples of suitable other binders are, for example, the polyacrylate resins which are obtainable commercially under the name Macrynal® SM 510 and SM 513 from Hoechst, and the hydroxyl group-containing polyacrylate resins which are described in German Patent Application DE-A-40 24 204 and are prepared in the presence of a polyester. For details, reference is made to DE-A-40 24 204, especially page 3, line 18, to page 7, line 53.

A further suitable example of another binder is a hydroxyl group-containing polyacrylate resin which is obtainable by polymerizing (m1) from 10 to 51% by weight of a mixture comprising (m11) one or more monomers selected from the group consisting of 4-hydroxy-n-butyl acrylate and/or 4-hydroxy-n-butyl methacrylate and/or 3-hydroxy-n-butyl acrylate and/or 3-hydroxy-n-butyl methacrylate, and (m12) one or more monomers selected from the group consisting of 3-hydroxy-n-propyl acrylate and/or 3-hydroxy-n-propyl methacrylate and/or 2-hydroxy-n-propyl acrylate and/or 2-hydroxy-n-propyl methacrylate, (m2) from 0 to 20% by weight of a hydroxyl group-containing ester of acrylic acid or methacrylic acid which is different from (m1) and has at least 5 carbon atoms in the alcohol residue, or of a mixture of such monomers, (m3) from 28 to 85% by weight of an aliphatic or cycloaliphatic ester of acrylic acid or methacrylic acid which is different from (m1) and (m2) and has at least 4 carbon atoms in the alcohol residue, or of a mixture of such monomers, (m4) from 0 to 25% by weight of an aromatic vinyl hydrocarbon which is different from (m1), (m2) and (m3), or of a mixture of such monomers, (m5) from 0 to 5% by weight of an ethylenically unsaturated carboxylic acid or of a mixture of ethylenically unsaturated carboxylic acids, and (m6) from 0 to 20% by weight of an ethylenically unsaturated monomer which is different from (m1), (m2), (m3), (m4) and (m5), or of a mixture of such monomers to give a polyacrylate resin having a hydroxyl number of from 60 to 200 mg of KOH/g, an acid number of from 0 to 35 mg of KOH/g and a number-average molecular weight of from 1000 to 5000, the sum of the proportions by weight of components (m1) to (m6) being in each case 100% by weight.

Examples of compounds which are suitable as monomer components (m1) to (m6) are the compounds listed in the description of acrylate resin (A).

The polyisocyanate component (B) may comprise any desired organic polyisocyanates which have free isocyanate groups bonded to aliphatic, cycloaliphatic, araliphatic and/or aromatic structures. It is preferred to employ polyisocyanates having from 2 to 5 isocyanate groups per molecule. If desired, small quantities of organic solvent, preferably from 1 to 25% by weight based on pure polyisocyanate, may be added to the polyisocyanates so as to improve the ease of incorporation of the isocyanate. Examples of suitable solvent additives for the polyisocyanates are ethoxyethyl propionate, butyl acetate and the like.

Examples of suitable isocyanates are described, for example, in "Methoden der organischen Chemie" [Methods of Organic Chemistry], Houben-Weyl, Volume 14/2, 4th Edition, Georg Thieme Verlag, Stuttgart 1963, page 61 to 70, and by W. Siefken, Liebigs Ann. Chem. 562, 75 to 136. Suitable examples are 1,2-ethylene diisocyanate, 1,4-tetramethylene diisocyanate, 1,6-hexamethylene diisocyanate, 2,2,4- and/or 2,4,4-trimethyl-1,6-hexamethylene diisocyanate, 1,12-dodecane diisocyanate, ω,ω'-diisocyanatodipropyl ether, cyclobutane 1,3-diisocyanate, cyclohexane 1,3- and 1,4-diisocyanate, 2,2- and 2,6-diisocyanato-1-methylcyclohexane, 3-isocyanatomethyl-3,5,5-trimethylcyclohexyl isocyanate ("isophorone diisocyanate"), 2,5- and 3,5-bis (isocyanatomethyl)-8-methyl-1,4-methano-decahydronaphthalene, 1,5-, 2,5-, 1,6- and 2,6-bis (isocyanatomethyl)-4,7-methanohexahydroindane, 1,5-, 2,5-, 1,6- and 2,6-bis(isocyanato)-4,7-methanehexahydroindane [sic], dicyclohexyl 2,4'- and 4,4'-diisocyanate, 2,4- and 2,6-hexahydrotolylene diisocyanate, perhydro-2,4'- and -4,4'-diphenylmethane diisocyanate, ω,ω'-diisocyanato-1,4-diethylbenzene, 1,3- and 1,4-phenylene diisocyanate, 4,4'-diisocyanatobiphenyl, 4,4'-diisocyanato-3,3'-dichlorobiphenyl, 4,4'-diisocyanato-3,3'-dimethoxybiphenyl, 4,4'-diisocyanato-3,3'-dimethylbiphenyl, 4,4'-diisocyanato-3,3'-diphenylbiphenyl, 2,4'- and 4,4'-diisocyanatodiphenylmethane, naphthylene 1,5-diisocyanate, tolylene diisocyanates such as 2,4- and 2,6-tolylene diisocyanate, N,N'-(4,4'-dimethyl-3,3'-diisocyanatodiphenyl)uretdione, m-xylylene diisocyanate, dicyclohexylmethane diisocyanate, tetramethylxylylene diisocyanate, but also triisocyanates such as 2,4,4'-triisocyanatodiphenyl ether, 4,4',4"-triisocyanatotriphenylmethane. Preference is given to employing, in combination if desired with the abovementioned polyisocyanates, polyisocyanates which contain isocyanurate groups and/or biuret groups and/or allophanate groups and/or urethane groups and/or urea groups. Polyisocyanates containing urethane groups are obtained, for example, by reacting some of the isocyanate groups with polyols, for example trimethylolpropane and glycerol.

It is preferred to employ aliphatic or cycloaliphatic polyisocyanates, especially hexamethylene diisocyanate, dimerized and trimerized hexamethylene diisocyanate, isophorone diisocyanate, dicyclohexylmethane 2,4'-diisocyanate or dicyclohexylmethane 4,4'-diisocyanate or mixtures of these polyisocyanates. It is very particularly preferred to employ mixtures of polyisocyanates which are based on hexamethylene diisocyanate and contain uretdione and/or isocyanurate groups and/or allophanate groups, and as are formed by catalytic oligomerization of hexamethylene diisocyanate using appropriate catalysts. The polyisocyanate component (B) may additionally comprise any desired mixtures of the polyisocyanates mentioned by way of example.

The quantity of crosslinking agent employed is chosen such that the ratio of the isocyanate groups of the crosslinking agent to the hydroxyl groups of the binder component is in the range from 1:3 to 3:1. The coating compositions according to the invention usually contain from 15 to 45% by weight of the acrylate resin (A), from 0 to 30% by weight of the other binder component and from 6 to 20% by weight of the crosslinking agent (B), based in each case on the overall weight of the coating composition and based on the solids content of the binder and crosslinking components.

The coating compositions according to the invention also contain one or more organic solvents. These solvents are usually employed in quantities from 20 to 70% by weight, preferably from 25 to 65% by weight, based in each case on the overall weight of the coating composition.

Examples of suitable solvents are relatively highly substituted aromatic substances, for example Solvent Naphtha®, heavy benzole, various Solvesso® grades, various Shellsol® grades and Deasol®, and relatively high-boiling aliphatic and cycloaliphatic hydrocarbons, for example various white spirits, mineral turpentine oil, tetralin and decalin, and also various esters such as, for example, ethylglycol acetate, butylglycol acetate, ethyldiglycol acetate and the like.

The coating compositions according to the invention may additionally contain conventional auxiliaries and additives in conventional quantities, preferably from 0.01 to 10% by weight based on the overall weight of the coating composition. Examples of suitable auxiliaries and additives are leveling agents such as silicone oils, plasticizers such as phosphates and phthalates, viscosity-controlling additives, matting agents, UV absorbers, light stabilizers and, if desired, fillers.

The coating compositions are prepared in a known manner by mixing and, if desired, dispersing the individual components.

These coating compositions can be applied in the form of a film to a substrate by spraying, flow coating, dipping, rolling, knife coating or brushing, the film subsequently being cured to give a firmly adhering coating.

These coating compositions are conventionally cured at room temperature or slightly elevated temperature, advantageously at temperatures below 100° C. and preferably at temperatures below 80° C. However, the coating compositions can also be cured under baking conditions, i.e. at temperatures of at least 100° C. Suitable substrates are, in particular, metals and also wood, plastic, glass and the like. Owing to the short curing times and low curing temperatures, the coating compositions according to the invention are preferably used for automotive refinishing, the finishing of large vehicles and goods-vehicle bodies. However, depending on the crosslinking agent employed they can also be utilized for the production-line finishing of motor vehicles. Furthermore, they are particularly suitable as a clearcoat.

The present invention therefore also relates to a process for producing a multilayer protective and/or decorative coating on a substrate surface, in which (1) a pigmented basecoat is applied to the substrate surface
(2) a polymer film is formed from the basecoat applied in step (1),
(3) a transparent topcoat containing
    (A) a hydroxyl group-containing polyacrylate resin and
    (b) a crosslinking agent
is applied to the resulting basecoat, and subsequently
(4) basecoat and topcoat are cured together,
characterized in that the topcoat employed is the coating composition according to the invention.

The basecoats employed in this process are known and therefore require no further description. Examples of suitable basecoats also include the basecoats described in DE-A-41 10 520, DE-A 40 09 000, DE-A 40 24 204, EP-A-355 433, DE-A 35 45 618, DE-A 38 13 866 and in German Patent Application P 42 32 717.2, which is not a prior publication.

Also suitable are the basecoats described in the as yet unpublished German Patent Application P 43 27 416.1, which are characterized in that they contain a hydroxyl group-containing polyester having a weight-average molecular weight Mw of 40,000–200,000 and a polydispersity Mw/Mn>8, and in that the polyester has been prepared using at least 50% by weight of aromatic dicarboxylic acids or esterifiable derivatives thereof, but where the content of phthalic anhydride is no more than 80% by weight and the percentages by weight are based in each case on the overall weight of the acid components employed for the preparation of the polyester.

The coating compositions according to the invention are particularly notable for good adhesion to the basecoat, good mar resistance and a high degree of hardness of the resulting coatings. In addition, the coating compositions exhibit rapid drying coupled with an ability to be processed for a long time (pot life). Moreover, the resulting coatings, especially in the case of clearcoats, display good mechanical properties such as, for example, good gloss retention, good fullness and good leveling.

The invention will now be illustrated in more detail with reference to embodiment examples. In these examples all parts and percentages are by weight unless expressly stated otherwise.

I. Preparation of the Hydroxyl Group-containing Acrylate Resins E1 to E4 and V1 to V4 (Comparison Examples)

The monomers employed to prepare the hydroxyl group-containing acrylate resins E1 to E4 (according to the invention) and V1 to V4 (comparison) are indicated in Table 1. Among these monomers, the hydroxy-n-propyl(meth)acrylate employed was a commercially available mixture comprising 25% by weight 3-hydroxy-n-propyl (meth)acrylate and 75% by weight 2-hydroxy-n-propyl (meth)acrylate. The acrylate resins are prepared by initially introducing 34.27% of Shellsol®A, based on the mass of 100% of the monomer mixture, into a 4 l reactor which is suitable for polymerization reactions, and heating it to 145° C. Beginning simultaneously and at a uniform rate, a mixture of 100% of the monomers and 0.5% of mercaptoethanol, based on the mass of 100% of the monomer mixture, was metered in over the course of 4 hours, and 11.9% of the initiator solution, based on the mass of 100% of the monomer mixture, consisting of an 18.3% strength solution of tert-butylcymene hydroperoxide in xylene, was metered in over the course of 4.5 hours. Following 2 hours of after-polymerization, the batch was adjusted to a solids content of 60.4–63.4% with 98% butyl acetate.

The properties of the resulting acrylate resins are shown in Table 2.

II. Preparation of the Coating Compositions E1 to E4 of Examples 1 to 4 and of the Coating Compositions V1 to V4 of Comparison Examples 1 to 4

II.1 Preparation of a Curing Solution

A curing solution is prepared from the components indicated below, by mixing:

| | |
|---|---|
| Butyl acetate 98% | 40.5 parts |
| Xylene | 4.0 parts |
| Butylglycol acetate | 6.0 parts |
| Catalyst solution | 1.5 parts |
| Desmodur ® Z 4370[1]) | 15.0 parts |
| Desmodur ® N 3390[2]) | 33.0 parts |

[1]) Commercial polyisocyanate from Bayer AG, based on isophorone diisocyanate and having a solids content of 70% and an NCO content of 11%.
[2]) Commercial polyisocyanate from Bayer AG, based on a hexamethylene diisocyanate trimer having an average functionality of between 3 and 4 and a uretdione group content of between 0 and 3% by weight, and a solids content of 90% and an isocyanate content of 19.5%.

II.2 Preparation of an Adjustment Additive

An adjustment additive is prepared from the components indicated below, by mixing:

| | |
|---|---|
| Xylene | 20.0 parts |
| Solventnaphta ® | 15.0 parts |
| Benzine 135/180 | 10.0 parts |
| Butylglycol acetate | 5.0 parts |
| Butyl acetate (98/100) | 50.0 parts |

II.3 Preparation of a Catalyst Solution 1.0 part of dibutyltin dilaurate is mixed with 99.0 parts of butyl acetate 98/100.

II.4 Preparation of a Leveling Agent Solution 5.0 parts of a commercial leveling agent based on a polyether-modified methylpolysiloxane (commercial product Baysilone®OL 44 from Bayer AG) and 95.0 parts of xylene are mixed.

II.5 Preparation of the Clearcoat Solutions E1 to E4 and V1 to V4

The clearcoat solutions are prepared by mixing the components indicated in Table 3.

II.6 Preparation of the Transparent Topcoats E1 to E4 and V1 to V4 (Comparison Examples)

The transparent topcoats are prepared by mixing in each case 100 parts by volume of the clearcoat solutions E1 to E4 or V1 to V4 with 50 parts by volume of the curing solution described above and 10 parts by volume of the adjustment additive described above.

The coating material obtained in this way in then applied to phosphatized and coated steel panels. For this purpose the phosphatized steel panels are coated by spraying with a conventional commercial filler (commercial product Glasurit Grundfüller (primer-surfacer) EP 801-1552 from Glasurit GmbH, Münster, with an epoxy-functional binder and with an amino-functional curing agent) (dry film thickness from about 40 to 60 μm), dried at 80° C. for 45 min and at room temperature for 16 h and wet-sanded using P800 sandpaper and an eccentric sander. Subsequently, a basecoat is applied which comprises a mixture of 80 parts of a conventional commercial metallic basecoat (commercial product Basislack (Basecoat) AE 54M 99/9 Basisfarbe Aluminium superfine from Glasurit GmbH, Münster) based on a hydroxyl group-containing polyester, cellulose acetic butyrate, wax and a melamine resin, and 20 parts of a further conventional commercial basecoat (commercial product (Basislack (basecoat) AE 54M 552 Basisfarbe Helioblau from Glasurit GmbH, Münster) based on a hydroxyl group-containing polyester, cellulose acetobutyrate, wax and a melamine resin, by first of all applying one spray pass and, after an intermediate flash-off time of 5 min, applying a second spray pass (spray pressure in each case 4–5 bar). The dry film thickness of the basecoat is about 20 μm. After a flash-off time of 30 min the clearcoat is applied by first of all applying one spray pass and, after an intermediate flash-off time of 3 min, applying a second spray pass (spray pressure in each case 4–5 bar). The panels are then dried under different conditions, depending on the test carried out. The dry film thickness of the clearcoat is about 50–80 μm.

The test results of the resulting coatings are shown in Table 4.

TABLE 1

Composition of the acrylate resins in % by weight

|  | E1 | V1 | E2 | V2 | E3 | V3 | E4 | V4 |
|---|---|---|---|---|---|---|---|---|
| Styrene | 23 | 23 | 24 | 24 | 16 | 16 | — | — |
| n-BMA | 6 | 6 | 6.5 | 6.5 | 6 | 6 | 9 | 9.5 |
| t-BA | — | 14 | — | — | — | — | — | — |
| t-BCA | 14 | — | 15 | 15 | 42 | — | 22 | 23 |
| MMA | 21 | 21 | 22 | 22 | — | 42 | 33 | 35 |
| EHA | — | — | — | — | 7 | 7 | — | — |
| HPMA | 36 | 36 | — | — | — | 29 | 36 | — |
| HPA | — | — | 32.5 | — | 29 | — | — | — |
| HEMA | — | — | — | 32.5 | — | — | — | 32.5 |

Explanations for Table 1
n-BMA = n-butyl methacrylate
t-BA = t-butyl acrylate
t-BCA = t-butylcyclohexyl acrylate
MMA = methyl methacrylate
EHA = 2-ethylhexyl acrylate
HPMA = mixture of 25% by weight 3-hydroxy-n-propyl methacrylate and 75% by weight 2-hydroxy-n-propyl methacrylate
HPA = mixture of 25% by weight 3-hydroxy-n-propyl acrylate and 75% by weight 2-hydroxy-n-propyl acrylate
HEMA = 2-hydroxyethyl methacrylate

TABLE 2

Properties of the acrylate resins

|  | E1 | V1 | E2 | V2 | E3 | V3 | E4 | V4 |
|---|---|---|---|---|---|---|---|---|
| OH Number [mgKOH/g] | 140 | 140 | 140 | 138 | 125 | 113 | 140 | 140 |
| Acid No. [mgKOH/g] | 2.3 | 2.7 | 1.7 | 1.5 | 2.9 | 2.1 | 1.6 | 1.6 |
| $M_n$ | 2400 | 2700 | 2682 | 2700 | 2711 | 3100 | 2342 | 2493 |
| $M_w$ | 5900 | 6700 | 9879 | 7500 | 6938 | 9182 | 7397 | 8572 |
| $M_n/M_w$ [sic] | 2.46 | 2.49 | 3.69 | 2.78 | 2.56 | 2.96 | 3.16 | 3.44 |
| $T_g(A)$ [°C.] | 81 | 81 | 49 | 82 | 35 | 72 | 77 | 71 |
| $T_g(b)$ [°C.] | 73 | 73 | −7 | 55 | −7 | 73 | 73 | 55 |
| $T_g(d)$ [°C.] | 82 | 79 | 82 | 82 | −22 | 65 | 83 | 83 |

[1] Calculated using the experimental $T_g$ value of 4-t-butylcyclohexyl acrylate of 73° C.

TABLE 3

Composition of the clearcoat solutions in parts by weight

|  | CE1 | CV1 | CE2 | CV2 | CE3 | CV3 | CE4 | CV4 |
|---|---|---|---|---|---|---|---|---|
| AE1[1] | 87.— | — | — | — | — | — | — | — |
| AV1[1] | — | 87.— | — | — | — | — | — | — |
| AE2[1] | — | — | 87.— | — | — | — | — | — |
| AV2[1] | — | — | — | 87.— | — | — | — | — |
| AE3[1] | — | — | — | — | 87.— | — | — | — |
| AV3[1] | — | — | — | — | — | 87.— | — | — |
| AE4[1] | — | — | — | — | — | — | 87.— | — |
| AV4[1] | — | — | — | — | — | — | — | 87.— |
| LS1[2] | 0.9 | 0.9 | 0.9 | 0.9 | 0.9 | 0.9 | 0.9 | 0.9 |
| LS2[3] | 0.9 | 0.9 | 0.9 | 0.9 | 0.9 | 0.9 | 0.9 | 0.9 |
| DBTL[4] | 2.0 | 2.0 | 2.0 | 2.0 | 2.0 | 2.0 | 2.0 | 2.0 |
| LA[5] | 3.8 | 3.8 | 3.8 | 3.8 | 3.8 | 3.8 | 3.8 | 3.8 |
| BGA[6] | 2.4 | 2.4 | 2.4 | 2.4 | 2.4 | 2.4 | 2.4 | 2.4 |
| BA[7] | 3.0 | 3.0 | 3.0 | 3.0 | 3.0 | 3.0 | 3.0 | 3.0 |
| SC(%)[8] | 52.2 | 52.2 | 52.2 | 52.2 | 52.2 | 52.2 | 52.2 | 52.2 |

Explanations for Table 3

[1] Acrylate resin solutions E1 to E4 and V1 to V4 described in Table 1, but all adjusted uniformly to a solids content of 58% with butyl acetate
[2] Tinuvin ® 292 from Ciba Geigy, commercial light stabilizer based on a sterically hindered amine (HALS)
[3] Tinuvin ® 1130 from Ciba Geigy, commercial light stabilizer based on a benzotriazole
[4] Catalyst solution described under Section II.3.
[5] Leveling agent solution described under Section II.4.
[6] Butylglycol acetate
[7] Butyl acetate, 98%
[8] Solids content

TABLE 4

Test results of the coating compositions/coatings

|  | CE1 | CV1 | CE2 | CV2 | CE3 | CV3 | CE4 | CV4 |
|---|---|---|---|---|---|---|---|---|
| Adhesion | 23 | 17 | 0 | 64 | 0 | 22 | 0 | 55 |
| Viscosity(s) | 15 | 15 | 15 | 19 | 15 | 21 | 23 | 29 |
| After 2 h | 20 | 18 | 19 | gel.[1] | 17 | 30 | 43 | gel.[2] |
| Dust dry (min) | 125 | 130 | 190 | 90 | 125 | 90 | 125 | 105 |
| Tack-free (min) | 280 | 310 | 435 | 200 | 330 | 260 | 270 | 200 |
| Petroleum test (days) | 7 | >21 | 8 | 7 | 7 | 8 | 3 | 3 |
| Volvo test Color Comparison | m0/g0 | m0/g0 | m0/g0 | m0/g0 | m0/g0 | m0/g0 | m0/g0 | m0/g0 |
| Viewed straight on | — | dk. | eq. | li. | li. | slightly dk | li. | li. |
| Viewed at an angle | — | li. | eq. | dk. | eq. | slightly li | eq. | dk. |
| Assessment | sat. | not. sat. | sat. | sat. | sat. | not. sat. | sat. | sat. |

[1] gelled after 30 min.
[2] gelled after 60 min.

Explanations for Table 4

The tests indicated in Table 4 are carried out as follows:
Color in accordance with DIN6174:
Standard light source D
3 angle measuring instrument MMK111, Datacolor The base color used was a mixture of the commercial base colours from BASF L+F, (Münster-Hiltrup, Germany) series 54. A mixture of 80 parts by weight. 54M 99/9 Basisfarbe (base color) Aluminium superfine and 20 parts by weight 54M 552 Basisfarbe [base color] Helioblau was used. The test coating material is applied as described under section II.6. to a 40×60 cm steel panel and dried at 60° C. for 30 min. After storage at room temperature for 24 h, the color test is carried out. The panels are assessed under an Osram Universal white neon lamp:
1. Viewed straight on: the panels are compared with the standard panel (coated with the clearcoat according to the invention of Example 1) at an angle of about 20° to the vertical.
2. Viewed at an angle: the panels are compared with the standard panel (coated with the clearcoat according to the invention of Example 1) at an angle of about 70° to the vertical.

Evaluation:

The light/dark change between panels viewed straight on and at an angle should be as pronounced as possible. The straight-on view is satisfactory if the panel with the test clearcoat is of equal lightness to or greater lightness than the standard panel. The angular view is satisfactory if the panel with the test coating material is of equal lightness to or lesser lightness than the standard panel.

Adhesion test with the high-pressure cleaner:
High-pressure cleaner
80 bar pressure
Throughput 800l/h
Temperature: cold
Distance of the nozzle from the test panel: 5 cm The test coating material is applied as described under section II.6. to a 40×60 cm steel panel and dried at 60° C. for 30 min. After storage at room temperature for 7 days, a triangle with a lateral length of 10 cm is cut through the coats of paint using a knife. The cut must be made down to the substrate. Subsequently, the sides of the triangle are subjected to the jet of the high-pressure cleaner for 10 s in each case.

Evaluation: A metal lattice cut into squares, having a mesh size of ½ inch (1.3 cm) and a total edge length of 6 inches (15.4 cm) (144 squares), is laid over the triangle. Every square in which there is a loss of adhesion between clearcoat and basecoat is counted.

Dust dry time:

About 15 minutes after the application of the coating material by spraying, a small sample of marine sand (3–4 g) is scattered on one corner of the panel. The panel is then dropped on one edge from a height of 30 cm (free fall). Dust dryness is attained when no sand adheres. The test is repeated at 15 minute intervals; shortly before dust dryness is attained the repetition interval is shortened to 5 minutes.

Freedom from tack:

About 20 minutes after dust dryness has been attained, the coated panel is covered with a piece of paper measuring about 3 cm². A small panel of hard plastic is laid on this paper, and then a weight of 100 g is placed on the panel. After exactly 1 minute testing is carried out as in the test for dust dryness, to see whether the paper still adheres. Testing is repeated at 15 minute intervals; shortly before freedom from tack is attained, the repetition interval is shortened to 5 minutes.

Petroleum resistance:

As described above, the clearcoat is applied to phosphatized, coated steel panels which are coated with the filler and basecoat described above, and dried at room temperature. The first test for petroleum resistance is carried out after storage at room temperature for 24 hours.

Procedure: A wadding pad (filter grade, type T950, size 2.3 from Seitz) impregnated with 1 ml of premium-grade petroleum (lead-free) whose bottom face possesses a lattice structure is laid on the coat of paint and subjected for 5 minutes to a weight of 100 g. The structure brought about by the swelling-up of the paint surface is then assessed visually: not marked, very slightly marked, slightly marked, marked, heavily marked, very heavily marked. The value indicated is the period of storage at room temperature, in days, after which the petroleum test is satisfactory, i.e. no marking is visible.

Viscosity:

The viscosity is measured in each case as the flow time from the DIN 4 cup at 20° C.

Volvo Crack Test:
Test conditions 1 cycle:
  4 h at 50° C. in an oven
  2 h at 35° C. and 95–100% rel. atmospheric humidity
  2 h at 35° C. and 95–100% rel. atmospheric humidity and 2 l of sulfur dioxide
  16 h at −30° C. in a deep-freeze cabinet
  Wash panel with water and dry Evaluation:
  Degree of blistering in accordance with DIN 53209
  Cracks ASTM D660

III. Summary of the Test Results

The clearcoat E1 of Example 1 shows adequate adhesion with good drying and a good pot life. The light/dark change of the basecoat is good. In contrast, the clearcoat V1 of Comparison Example 1 shows poorer drying, poorer petroleum resistance and a slight incipient dissolution of the basecoat. The light/dark change is no longer adequate.

In relation to the clearcoat of Example 1, the clearcoat E2 of Example 2 shows a distinctly enhanced adhesion. The light/dark change in the basecoat is good. The drying, however, is slower than that of the clearcoats of Example 1 and of Comparison Example V1.

The adhesion and pot life of the clearcoat of Comparison Example V2 is inadequate. The light/dark change in the basecoat is in this coat better than that of Example 1.

The clearcoat of Example 3 displays a markedly enhanced adhesion compared to the clearcoat of Example 1. The light/dark change of the basecoat is good. The drying, however, is slower than that of the clearcoats of Example 1 and of Comparison Example V1.

The clearcoat of Comparison Example V3 displays adequate adhesion with a reduced pot life. The light/dark change of the basecoat is inadequate.

The clearcoat of Example 4 shows a sharply reduced pot life. The light/dark change is good and the adhesion is markedly better than that of the clearcoat of Example 1.

The clearcoat of Comparison Example V4 shows a very poor adhesion with a short pot life. The light/dark change of the basecoat is good.

We claim:
1. Coating composition comprising
   (A) at least one hydroxyl group-containing polyacrylate resin obtained by polymerizing

(a) from 5 to 80% by weight of a cycloaliphatic ester of methacrylic acid and/or acrylic acid, or a mixture of such monomers, (b) from 10 to 50% by weight of a hydroxyl group-containing alkyl ester of methacrylic acid and/or acrylic acid, or mixtures of such monomers, (c) from 0 to 25% by weight of a hydroxyl group-containing, ethylenically unsaturated monomer which is different from (a) and (b), or a mixture of such monomers, (d) from 5 to 80% by weight of an aliphatic ester of methacrylic and/or acrylic acid which is different from (a), (b) and (c), or a mixture of such monomers, (e) from 0 to 40% by weight of an aromatic vinyl hydrocarbon which is different from (a), (b), (c) and (d), or a mixture of such monomers, and (f) from 0 to 40% by weight of a further ethylenically unsaturated monomer which is different from (a), (b), (c), (d) and (e), or a mixture of such monomers, and (B) at least one crosslinking agent, wherein the polyacrylate resin A has a number-average molecular weight Mn of from 1000 to 5000, a ratio of the weight-average molecular weight Mw to the number-average molecular weight Mn of less than 5.0 and an OH number of from 60 to 180 mg of KOH/g, the sum of the proportions by weight of components (a) to (f) always being 100% by weight and the monomers or monomer mixtures employed as component (b) only being those which, on polymerization of the respective monomer alone, produce a polyacrylate and/or polymethacrylate resin having a glass transition temperature of from −10° C. to +6° C. or from +60° C. to 80° C.

2. Coating composition according to claim 1, wherein component (b) is selected from the group consisting of 3-hydroxypropyl methacrylate, 3-hydroxypropyl acrylate, 2-hydroxypropyl methacrylate, 2-hydroxypropyl acrylate, and mixtures thereof.

3. Coating composition according to claim 1, wherein component (d) is chosen such that the polymerization of the component (d) alone produces a polyacrylate and/or polymethacrylate resin having a glass transition temperature of from −70° C. to +120° C.

4. Coating composition according to claim 1, wherein component (d) is selected from the group consisting of n-butyl methacrylate, n-butyl acrylate, t-butyl methacrylate, t-butyl acrylate, isobutyl methacrylate, isobutyl acrylate, methyl methacrylate, methyl acrylate, 2-ethylhexyl methacrylate, 2-ethylhexyl acrylate, lauryl methacrylate, lauryl acrylate, stearyl methacrylate, stearyl acrylate, ethyltriglycol methacrylate, furfuryl methacrylate and furfuryl acrylate.

5. Coating composition according to claim 1, wherein component (a) is selected from the group consisting of cyclohexyl methacrylate, cyclohexyl acrylate, isobornyl methacrylate, isobornyl acrylate, 4-t-butylcyclohexyl acrylate, 4-butylcyclohexyl methacrylate and mixtures thereof.

6. Coating composition according to claim 1, wherein the acrylate resin is obtained by polymerizing (a) from 5 to 30% by weight of component (a), (b) from 15 to 40% by weight of component (b), (c) from 0 to 15% by weight of component (c), (d) from 5 to 30% by weight of component (d), (e) from 10 to 30% by weight of component (e), and (f) from 0 to 30% by weight of component (f), the sum of the proportions by weight of components (a) to (f) always being 100% by weight.

7. Coating composition according to claim 1, wherein the polyacrylate resin has a number-average molecular weight Mn of from 1800 to 4000, a ratio of the weight-average molecular weight Mw to the number-average molecular weight Mn of from 1.8 to 4.0 and an OH number of from 80 to 160 mg of KOH/g.

8. Coating composition according to claim 1, wherein the coating composition contains as crosslinking agent (B) at least one di- and/or polyisocyanate.

9. Coating composition according to claim 1, further comprising at least one other binder which is different from the acrylate resin (A), selected from the group consisting of polyacrylate resins, polycondensation resins, and mixtures thereof.

10. Coating composition according to claim 1, wherein component (a) is selected from the group consisting of 4-t-butylcyclohexyl acrylate, 4-butylcyclohexyl methacrylate, and mixtures thereof.

11. Coating composition according to claim 1, wherein crosslinking agent (B) is selected from the group consisting of at least one diisocyanate, polyisocyanate which contains isocyanurate groups, and mixtures thereof.

12. Process for producing a multilayer protective and/or decorative coating on a substrate surface, comprising the steps of (1) applying a pigmented basecoat to the substrate surface (2) forming a polymer film from the basecoat applied in step (1), (3) applying to the resulting basecoat a transparent topcoat containing (A) a hydroxyl group-containing polyacrylate resin and (B) a crosslinking agent, and subsequently (4) curing the basecoat and topcoat together, wherein the topcoat employed is a coating composition according to claim 1.

13. An automotive refinish coating composition comprising (A) at least one hydroxyl group-containing polyacrylate resin obtained by polymerizing (a) from 5 to 80% by weight of a cycloaliphatic ester of methacrylic acid and/or acrylic acid, or a mixture of such monomers, (b) from 10 to 50% by weight of a hydroxyl group-containing alkyl ester of methacrylic acid and/or acrylic acid, or mixtures of such monomers, (c) from 0 to 25% by weight of a hydroxyl group-containing, ethylenically unsaturated monomer which is different from (a) and (b), or a mixture of such monomers, (d) from 5 to 80% by weight of an aliphatic ester of methacrylic and/or acrylic acid which is different from (a), (b) and (c), or a mixture of such monomers, (e) from 0 to 40% by weight of an aromatic vinyl hydrocarbon which is different from (a), (b), (c) and (d), or a mixture of such monomers, and (f) from 0 to 40% by weight of a further ethylenically unsaturated monomer which is different from (a), (b), (c), (d) and (e), or a mixture of such monomers, and (B) at least one crosslinking agent, wherein the polyacrylate resin A has a number-average molecular weight Mn of from 1000 to 5000, a ratio of the weight-average molecular weight Mw to the number-average molecular weight Mn of less than 5.0 and an OH number of from 60 to 180 mg of KOH/g, the sum of the proportions by weight of components (a) to (f) always being 100% by weight and the monomers or monomer mixtures employed as component (b) only being those which, on polymerization of the respective monomer alone, produce a polyacrylate and/or polymethacrylate resin having a glass transition temperature of from −10° C. to +6° C. or from +60° C. to 80° C.

* * * * *